United States Patent
Xie et al.

(10) Patent No.: US 7,929,828 B1
(45) Date of Patent: Apr. 19, 2011

(54) METHOD FOR EDITING SOURCE VIDEO TO SLOW MOTION OR FAST MOTION ON THE RECORDABLE MEDIA

(75) Inventors: Jianlei James Xie, Carmel, IN (US); Mark Alan Schultz, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2515 days.

(21) Appl. No.: 10/129,878

(22) PCT Filed: Oct. 31, 2000

(86) PCT No.: PCT/US00/29992
§ 371 (c)(1),
(2), (4) Date: Sep. 27, 2002

(87) PCT Pub. No.: WO01/35648
PCT Pub. Date: May 17, 2001

Related U.S. Application Data

(60) Provisional application No. 60/164,793, filed on Nov. 10, 1999.

(51) Int. Cl.
*H04N 5/93* (2006.01)
*H04N 5/77* (2006.01)
*H04N 5/932* (2006.01)
*H04N 7/18* (2006.01)
*H04N 9/80* (2006.01)
*H04N 9/82* (2006.01)
*G11B 5/00* (2006.01)
*G11B 5/52* (2006.01)
*G11B 15/00* (2006.01)
*G11B 27/02* (2006.01)

(52) U.S. Cl. ........ 386/280; 386/221; 386/222; 386/224; 386/246; 386/247; 348/159; 360/5; 360/13; 360/81; 360/88

(58) Field of Classification Search .................. 386/1, 4, 386/6, 7, 46, 49, 52, 67, 68, 117, E5.005, 386/70; 360/13, 81, 88, 5; 348/159
See application file for complete search history.

(56) References Cited

U.S. PATENT DOCUMENTS 4,001,881 A * 1/1977 Folsom .............................. 360/5

(Continued)

FOREIGN PATENT DOCUMENTS

EP 762 756 A2 3/1997

(Continued)

OTHER PUBLICATIONS

Search Report.

*Primary Examiner* — Thai Tran
*Assistant Examiner* — Syed Y Hasan
(74) *Attorney, Agent, or Firm* — Robert D. Shedd; Robert B. Levy; Jorge Tony Villabon

(57) ABSTRACT

A method for editing source video in a DVD media for a slow motion recording special effect. According to the method, the DVD device receives a source video signal comprised of a plurality of source pictures. Each of the source video pictures is recorded in a selected picture frame on the DVD media. Subsequently s−1 copies of the selected source video picture on the DVD media in s−1 frames adjacent to the selected picture frame. For the purposes of the invention as described herein, s can be an integer value determined by a user selected motion speed. The user selected motion speed will be 1/s times slower relative to a normal motion speed.

In an alternative embodiment, the method can be used for editing source video in a DVD media for a fast motion record special effect. In that case, the DVD device receives a source video signal comprised of a plurality of source pictures. Only one out of every n of the source video pictures is chosen as a selected source video picture. Each the selected source video pictures is recorded in a selected picture frame on the DVD media. Source video pictures that are not selected source video pictures are dropped. According to the invention, n can be an integer value determined by a user selected motion speed.

8 Claims, 7 Drawing Sheets

U.S. PATENT DOCUMENTS

| | | | | |
|---|---|---|---|---|
| 4,783,704 | A | * | 11/1988 | Funston ........................ 386/110 |
| 4,916,555 | A | * | 4/1990 | Hathaway et al. .............. 386/78 |
| 5,497,237 | A | | 3/1996 | Hosokawa et al. |
| 5,631,998 | A | * | 5/1997 | Han ................................ 386/68 |
| 5,684,915 | A | | 11/1997 | Ueda et al. ...................... 386/68 |
| 5,864,646 | A | | 1/1999 | Searby ............................ 386/68 |
| 5,867,625 | A | | 2/1999 | McLaren ......................... 386/68 |
| 5,870,523 | A | | 2/1999 | Kikuchi et al. ................. 386/95 |
| 5,937,136 | A | | 8/1999 | Sato ................................ 386/52 |
| 6,031,573 | A | * | 2/2000 | MacCormack et al. . 375/240.16 |
| 6,157,391 | A | | 12/2000 | Johnson |
| 6,334,022 | B1 | * | 12/2001 | Ohba et al. ...................... 386/46 |
| 6,606,448 | B1 | | 8/2003 | Terauchi |
| 6,804,294 | B1 | * | 10/2004 | Hartung et al. ................ 375/240 |
| 2003/0180031 | A1 | * | 9/2003 | Kikuchi et al. ................. 386/46 |

FOREIGN PATENT DOCUMENTS

| | | |
|---|---|---|
| EP | 795 871 A2 | 9/1997 |
| JP | 04-252685 | 9/1992 |
| JP | 05-122659 | 5/1993 |
| JP | 7-222114 | 8/1995 |
| JP | 8-237588 | 9/1996 |
| JP | 11-136665 | 5/1999 |

* cited by examiner

METHOD FOR EDITING SOURCE VIDEO TO SLOW MOTION OR FAST MOTION ON THE RECORDABLE MEDIA

This application claims the benefit under 35 U.S.C. §365 of International Application PCT/US00/29992, filed Oct. 31, 2000, which claims the benefit of U.S. Provisional Application 60/164,793, filed Nov. 10, 1999.

BACKGROUND OF THE INVENTION

1. Technical Field

The inventive arrangements relate generally to methods and apparatus providing advanced operating features for audio only, video only and both video and audio programs recorded on disc media, for example recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

In many cases, the program presentations are recorded in the viewer and/or listener's absence, for presentation at a later, more convenient time. This is referred to as time shifting the program. At other times, a program is being viewed and/or listened to without being recorded, and with out any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales.

For example, one useful feature for creating a special effect involves recording source video to slow motion or fast motion on the recordable DVD media. Slow motion recording may be desirable for sporting events or other circumstances where the user desires the recorded scene to be played back in slow motion. Fast motion recording may be appropriate for nature studies or other video recordings wherein the recorded scene is to be played back in fast motion. Conventional recordable DVD does not provide any process for performing this function.

SUMMARY OF THE INVENTION

The invention concerns a method for editing source video in a DVD media for a slow motion recording special effect. According to the method, the DVD device receives a source video signal comprised of a plurality of source pictures. Each of the source video pictures is recorded in a selected picture frame on the DVD media. Subsequently s−1 copies of the selected source video picture on the DVD media in s−1 frames adjacent to the selected picture frame. For the purposes of the invention as described herein, s can be an integer value determined by a user selected motion speed. The user selected motion speed will be 1/s times slower relative to a normal motion speed. According to one aspect of the method, the invention can include the step of recording t seconds of the source video in response to a user selected recording time of t. In particular, this step involves recording the source video at the (1/s)X motion speed from a start time $t_0$ to an end time of $t_0+t$.

In an alternative embodiment, the method can be used for editing source video in a DVD media for a fast motion record special effect. In that case, the DVD device receives a source video signal comprised of a plurality of source pictures. Only one out of every n of the source video pictures is chosen as a selected source video picture. Each the selected source video pictures is recorded in a selected picture frame on the DVD media. Source video pictures that are not selected source video pictures are dropped. According to the invention, n can be an integer value determined by a user selected motion speed.

According to one aspect of the method for the fast motion recording, the system is responsive to a user selected motion speed which is n times faster relative to a normal motion speed. The system can record t seconds of the source video in response to a user selected recording time of t. The source video is then recorded at the nX motion speed from a start time $t_0$ to an end time of $t_0+t$.

In an alternative embodiment, the invention concerns a DVD device for editing source video in a DVD media for a slow motion recording special effect. The DVD device has a decoder for receiveing a source video signal comprised of a plurality of source pictures. A control CPU cooperating with appropriate DVD recording circuitry records each of the source video pictures in a selected picture frame on the DVD media. Subsequently the CPU and recording circuitry records s−1 copies of the selected source video picture on the DVD media in s−1 frames adjacent to the selected picture frame. For the purposes of the invention as described herein, s can be an integer value. The integer value can be determined by a user selected motion speed provided through a suitable user interface. The resulting user selected motion speed will be 1/s times slower relative to a normal motion speed of the DVD device. The DVD device can also include an advanced feature buffer for receiving a user input determining a special effect recording time. The CPU will respond to the user input by recording t seconds of the source video in response to a user selected recording time of t. In particular, the CPU will control the recording process to record the source video at the $(1/s)X$ motion speed from a start time $t_0$ to an end time of $t_0+t$, where X represents a normal motion playback and recording speed which is consistent with the motion of the original recorded image.

In an alternative embodiment, the DVD device can be used for editing source video in a DVD media for a fast motion record special effect. In that case, the DVD device receives in a TV decoder a source video signal comprised of a plurality of source pictures. The CPU in conjunction with the video processing circuitry selects only one out of every n of the source video pictures as a selected source video picture. The CPU in conjunction with the DVD recording circuitry then causes each of the selected source video pictures to be recorded in a selected picture frame on the DVD media. The CPU causes source video pictures that are not selected source video pictures to be dropped. According to the invention, n can be an integer value determined by a user selected motion speed which is received via an advanced feature input buffer.

In the DVD device for the fast motion recording, the advanced feature input buffer and control CPU are responsive to a user selected motion speed which is n times faster relative to a normal motion speed. The control CPU will cause t seconds of the source video to be recorded in response to a user selected recording time of t. The source video is then recorded at the nX motion speed from a start time $t_0$ to an end time of $t_0+t$ where X represents a normal motion playback and recording speed which is consistent with the motion of the original recorded image.

DETAILED DESCRIPTION OF THE PREFERRED EMBODIMENTS

Recordable DVD Device

Figure 1:
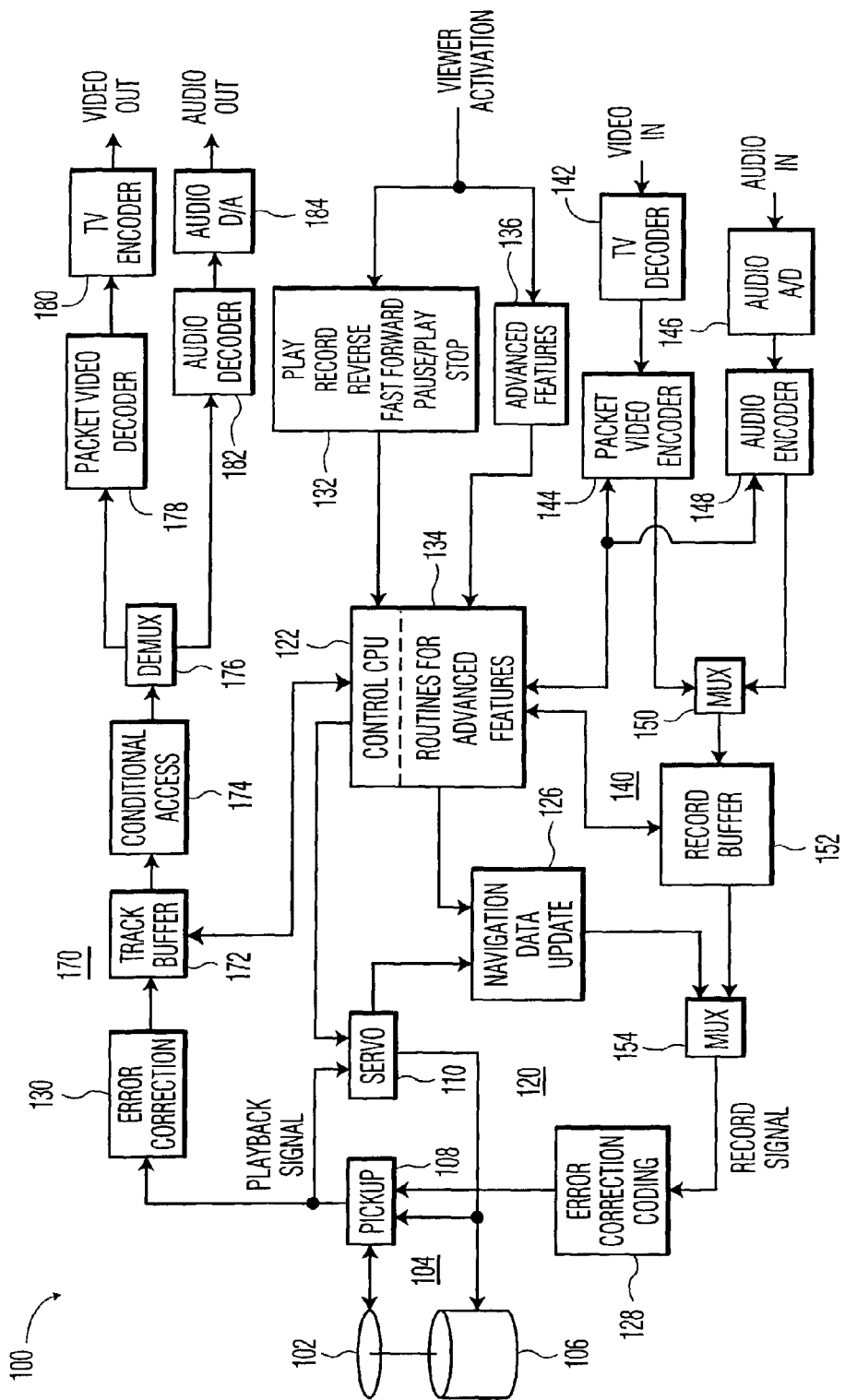
FIG. 1 is a block diagram of a rewritable DVD device that can be provided with one or more advance operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and record buffer 152 as shown in FIG. 1. CPU 122 can delete, modify, and reformat video data stored in the track buffer 172 and record buffer 152 for the purpose of implementing the inventive arrangements. Control and data interfaces are also preferably provided for permitting CPU 122 to control the operation of packet video encoder 144 and audio encoder 148 for implementing the inventive embodiments as described herein. Suitable software or firmware is provided in memory for the conventional operations performed by control CPU 122. In addition, program routines for the advanced features 134 are provided for controlling CPU 122 in accordance with the invention as shall hereinafter be described in greater detail.

A control buffer 132 for viewer activatable functions indicates those functions presently available, namely play, record, reverse, fast forward, slow play, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As groups of packets are constructed, they are combined with the output of the navigation data generation circuit in the MUX 154 and sent to the error correction coding circuit 128. Error correction coding circuit 128 can also be deemed to be part of the input path 140.

As a practical matter, the smallest addressable unit on the spiral track of a DVD is an ECC (error correction code) block of 16 sectors, where each sector includes 2048 bytes of user data. A group is a number of ECC blocks, for example 12. Each group of blocks represents approximately 0.5 seconds of combined video and audio program material. The amount of linear space along the spiral track needed to record a group of ECC blocks, for example 192 sectors, is defined herein as a segment of the spiral track. Accordingly, it can appear that the record buffer needs to be only large enough to store one segment of data. One segment of data can correspond, for example, to approximately 0.5 seconds of audio and video program material.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing. Accordingly, it can also appear that the track buffer 172 needs to be only large enough to store one segment of data, also corresponding to approximately 0.5 seconds of audio and video program material.

The video is decoded by decoder 178, for example from MPEG-1 or MPEG-2, and encoded by, for example, the TV encoder 180 as a conventional television signal, for example NTSC or PAL. The audio is decoded by circuit 182, for example from MPEG-1 or MPEG-2, and converted to analog form by audio digital-to-analog (D/A) converter 184. The output processing path 170 can be deemed to include the error correction circuit 130, as noted.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Media

Figure 2:
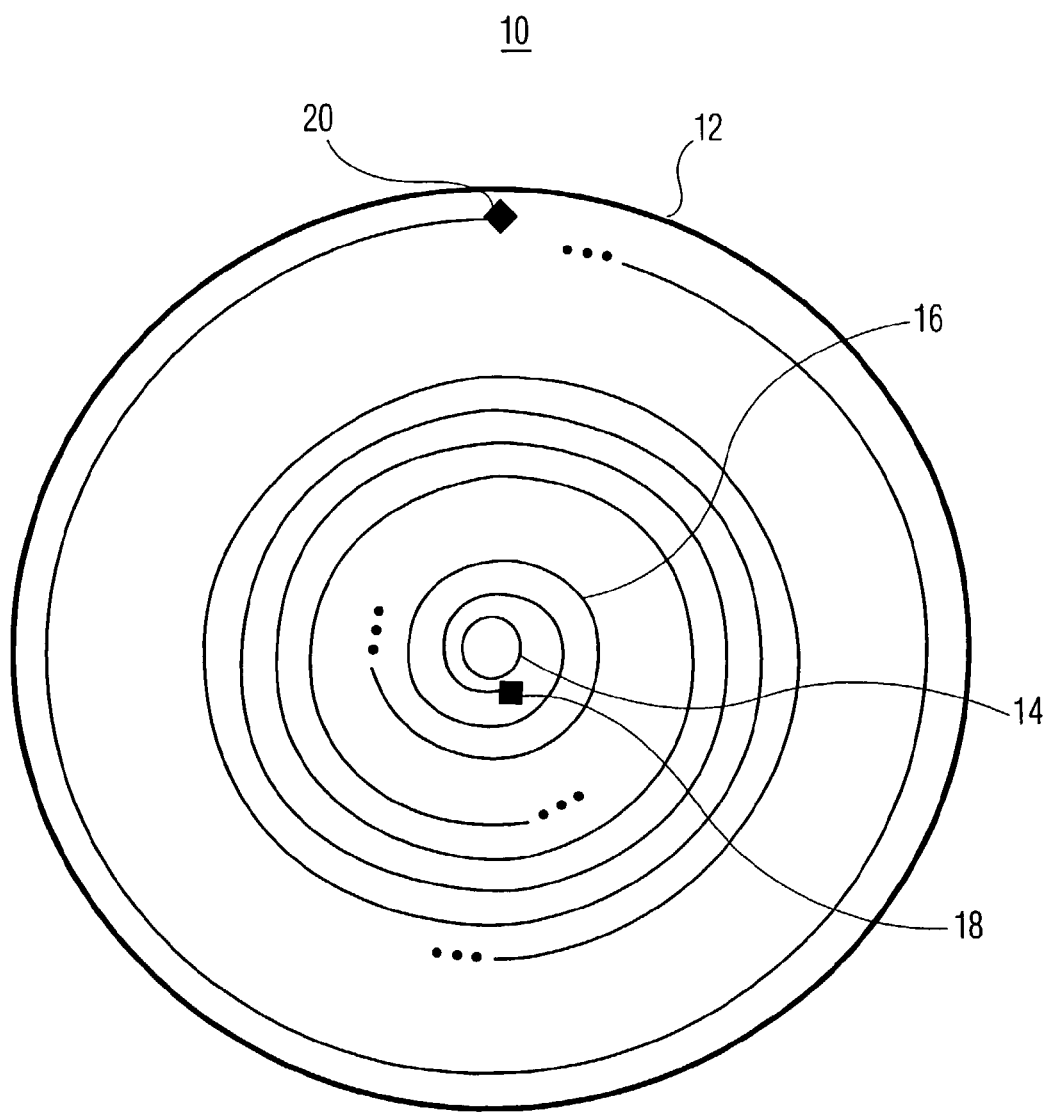
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12 having a hole 14 in the middle. The re-writable DVD can consist of two substrates bonded together by an adhesive layer forming a 1.2 mm thick disk. A center hole 14 can be formed in the center of the disk so that a gripping device of the motor 106 of FIG. 1 can securely grip the disk and control the angular motion of the same in accordance with the inventive arrangements.

The direction of recording on the track is typically outwardly along a spiral track 16, from a smaller radius part of the spiral to a larger radius part of the spiral. The several series of three large dots (_ _ _) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. Certain advanced features in accordance with the inventive arrangements utilize backward recording, that is, from a larger radius part of the spiral to a smaller radius part of the spiral. The track can also have a side-to-side wobble, not shown in the drawing, to accommodate media type indexing. Due to difficulties of scale, only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

DVD Data Structure

Figure 3:
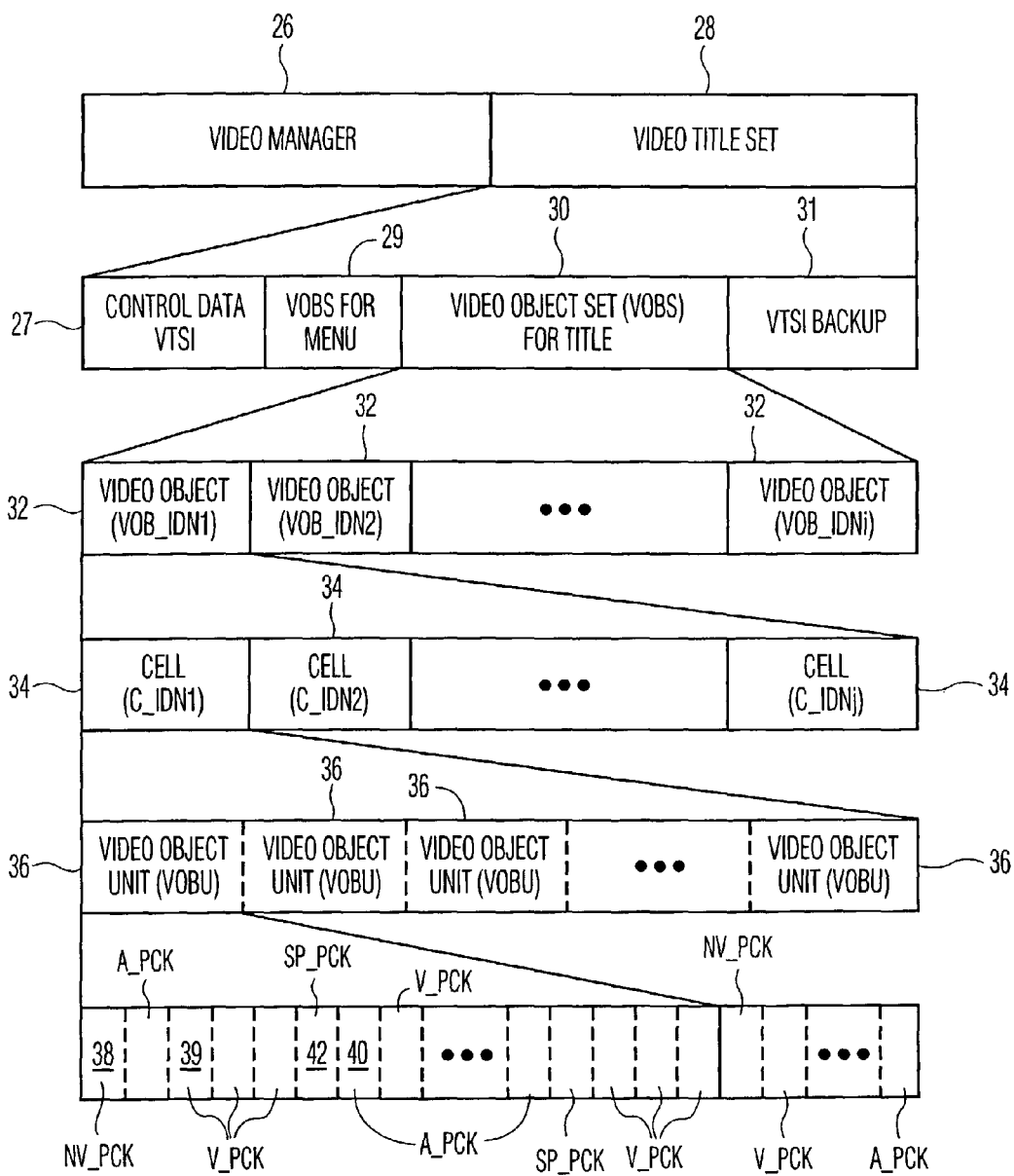
FIG. 3 is a diagram useful for explaining the organization of video object units in video object sets.

As shown in FIG. 3, each DVD contains a video manager 26 and video title set (VTS) 28. The VTS includes video title set information (VTSI) 27, an optional video object set for menu 29, and one or more VOBS for title 30 which contains the actual title content. Each VOBS 30 also includes a plurality of video objects 32. Each video object 32 includes a plurality of cells 34. Each VOBS is comprised of a collection of pointers to cells. In this way, the VOBS data links cells together and indicates in what order the programs or cells are to be played. Cells within a particular VOBS can be flagged for play in any desired order. For example, they can be played sequentially or randomly.

Each cell includes a plurality of VOBUs 36. Each of the VOBUs 36 in which the video content of the disc resides typically contains 0.4 to 1.0 seconds of presentation material. Each VOBU 36 is a sequence of data packs in recording order. Each VOBU starts with exactly one navigation pack (NV_PCK) 38 and could encompass all of following kinds of packs, including video packs (V_PCK) 39, audio packs (A_PCK) 40 and sub-picture packs (SP_PCK) 42. Each VOBU is nominally comprised of one group of pictures (GOP).

The NV_PCK 38 contains presentation control information as well as data search information. The data search information is useful in performing "trick" modes of playback, that is, any mode of DVD device operation other than normal play, stop and pause. One aspect of data search information (DSI) is that it helps the decoder to find reference pictures within the VOBU corresponding to the current NV_PCK. Another aspect of the DSI is that it helps the decoder to find VOBUs far into the future or past of presentation, relative to the current VOBU. The VOBUs in the past relative to the current VOBU presentation are referenced in fields of the NV_PCK known as the BWDI (backward information). The VOBUs in the future relative to the current VOBU presentation are referenced in fields of the NV_PCK known as FWDI (forward information).

Each VOBS can include navigation commands which permit branching or other interactive features. These navigation commands can be included as part of the VOBS as a set of pre-commands. These pre-commands can be followed by optional navigation commands identified within the NV_PCK 38 of the cells 34, which commands are executed after the cell is presented. Finally these may be followed in the VOBS by an optional set of post-commands. All of these commands are stored in a table within the VOBS and can be referenced by number so that they can be used repeatedly. The navigation commands can direct the control CPU 122 to perform a variety of operations associated with branching or interactive features. For example, they can provide flow control with commands such as goto, link, jump, exit, and so on.

It will be appreciated that the advanced features taught herein are applicable to other kinds of disk media and disk media players and recorders. Additionally, various modifications of the device illustrated in FIG. 1 and the disk medium illustrated in FIG. 2 can be used together to implement the advanced features taught herein in accordance with the inventive arrangements. In particular, a solution for editing source video to slow or fast motion in accordance with the inventive arrangements can include modifications of and additions to hardware, firmware and software in the control CPU 122 for recording data to recordable DVD media.

Editing Source Video to Slow Motion or Fast Motion on the Recordable Media

The inventive arrangements provide a method to allow editing of source video and recording slow or fast motion pictures onto a recordable DVD during a recording session. The user can determine if he or she wants to edit the source video during a recording session. After deciding to record a segment of source video into slow motion pictures at a speed of "1/s", the user can pause the source video output and rewind the source video to the desired starting point of slow motion picture, time "to". According to a preferred embodiment, a user input can be provided to identify the selected source segment and the slow motion speed "1/s" via an advanced feature buffer 136. The source segment can be identified in any suitable manner. According to one embodiment, the selected source video segment can be a user input specifically designating "t" seconds of source video replayed at a normal playback speed, beginning at a time $t_0$. The time $t_0$ can be designated by a user input specifying a start time. Alternatively, a user can mark an end point of a source video segment and then rewind to a start point which corresponds to $t_0$. As a further alternative, a user can input a start time and an end time corresponding to a source video segment. Those skilled in the art will recognize that the precise manner in which the source video is selected is not crucial to the invention and the invention is not intended to be limited in this regard.

Figure 4:
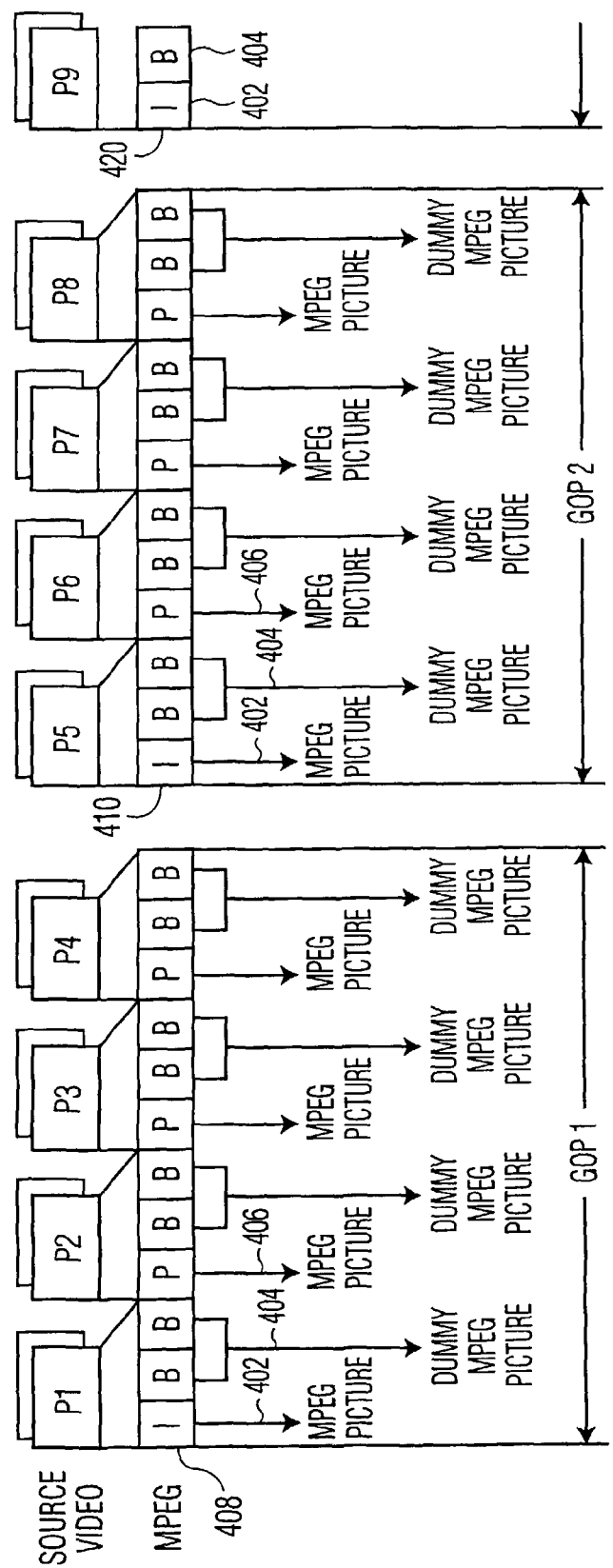
FIG. 4 is useful for explaining slow motion recording at 1/3X in accordance with the inventive arrangements.

FIG. 4 shows a set of typical GOPs 408, 410, and 420, each of which are comprised of a plurality of frames 402, 404, and 406. The frames can include I, B and P type frames as are well known in the art. The frames 402, 404, and 406 are arranged in accordance with an MPEG format. During the period of "$t_0$" and "$t_0+t$", each source picture P1 through P9 from an NTSC decoder 142 will be stored as an MPEG picture in one of I, B or P frames comprising the GOP. For example, the source video P1 will be stored in I frame 402. Further, each of the source pictures P1 through P9 will be applied to generate "s−1" copies of MPEG pictures in series in the MPEG encoder 144. For example, in FIG. 4 P1 is copied two times and stored in adjacent B frames 404 as shown. In general, after the encoder 144 completes an MPEG picture, the encoder 144 will continuously generate "s−1" dummy MPEG pictures that simply repeat the previous MPEG picture. The dummy pictures are preferably stored in frame locations adjacent to the original picture as shown. Slow motion recording at 1/3X is shown in FIG. 4, where X represents a normal motion playback and recording speed which is consistent with the motion of the original recorded image. In FIG. 4, the value of is equal to three (3). However, the invention is not limited in this regard. Instead, those skilled in the art will readily appreciate that the inventive arrangements can be applied to faster or slower recording speeds.

Significantly, only about a few hundred bits of data will be used to generate a dummy MPEG picture. Since the MPEG encoder does not need any significant time to encode dummy MPEG pictures, slow motion recording should be a real time recording, i.e., whole "st" second slow motion pictures will be encoded in "t" seconds. After time "$t_0+t$", the control CPU will preferably cause encoder 144 to automatically switched back to the mode of the normal video encoding and each source picture P1 through P9 will be used to generate one MPEG picture or frame.

Figure 5:
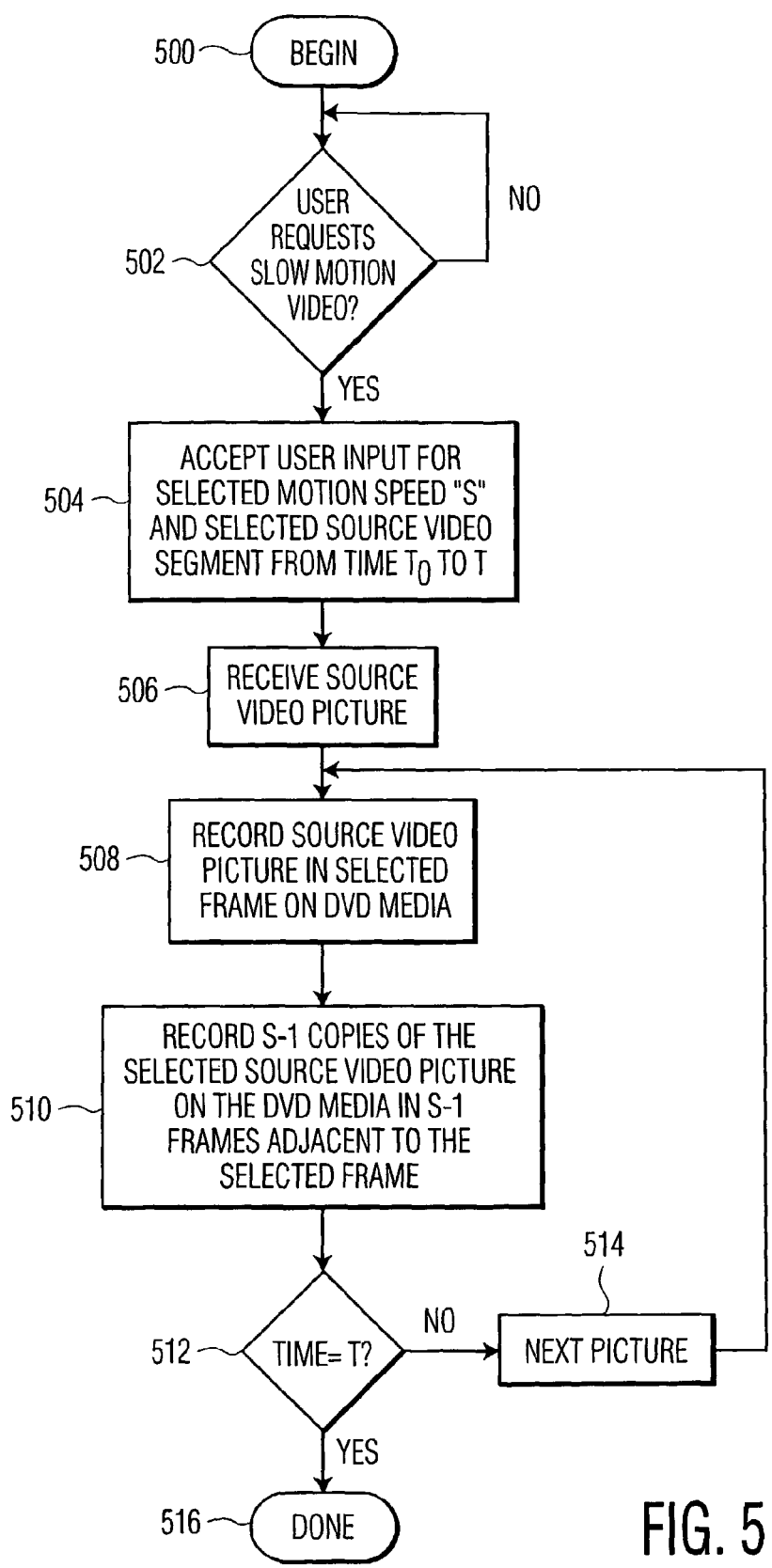
FIG. 5 is a flow chart which is useful for illustrating the process for slow motion recording.

FIG. 5 is a flow chart which is useful for illustrating the process for slow motion recording. As shown in FIG. 5, the process begins in step 500. In step 502, control CPU 122 can determine whether a user input has occurred requesting slow motion video. If so, then in step 504 the DVD device can accept user inputs for selected motion speed "s" and identification of a source video segment which can be defined by a time duration "t". In step 506, the system begins processing an input video stream by decoding a source video picture P1. In step 508, the system packet video encoder 144 encodes the source video picture in a selected frame and the data is subsequently recorded on the DVD device. In step 510, the DVD encoder 144 encodes s−1 copies of the selected source video picture on the DVD media in s−1 frames adjacent to the selected frame. Finally, in step 512, the control CPU checks to determine whether the time "t" has expired. If so, the process is terminated in step 516. Otherwise, the system goes on to step 514 by encoding the next source picture and continuing with the process in step 508.

Figure 6:
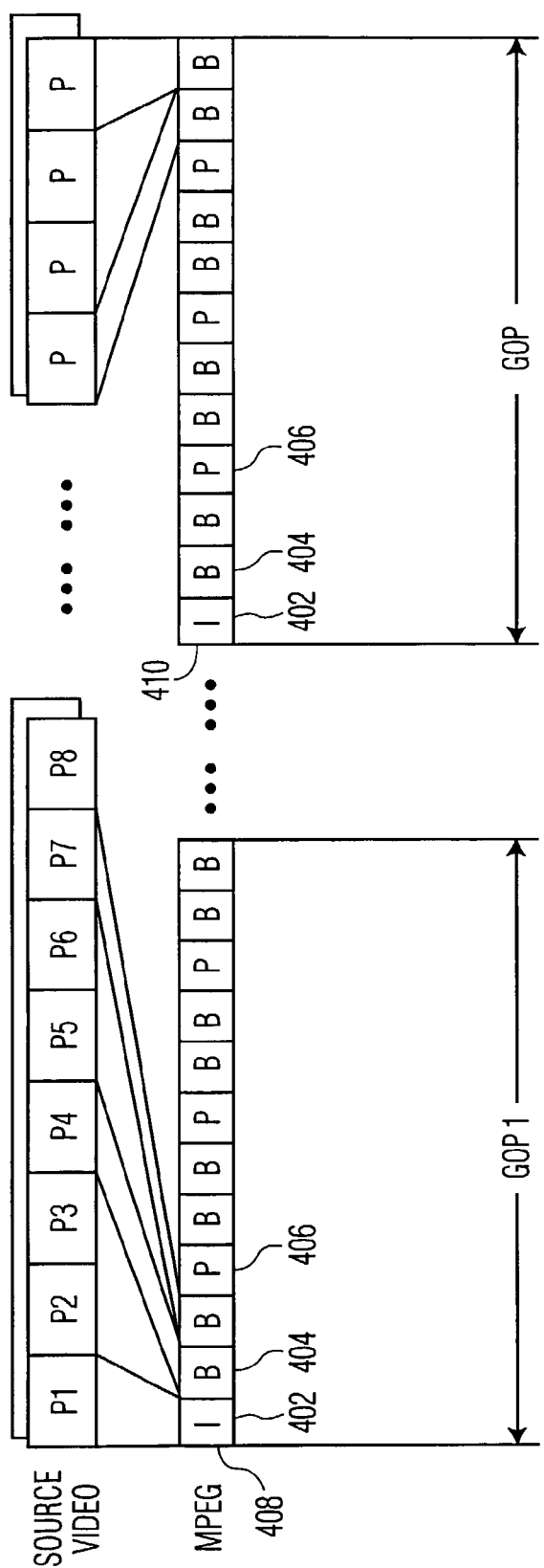
FIG. 6 is useful for explaining fast motion recording at 3X in accordance with the inventive arrangements.

FIG. 6 is an alternative embodiment of the invention where fast motion recording at 3X is shown, where X represents a normal motion playback and recording speed which is consistent with the motion of the original recorded image. Common elements in FIG. 6 are illustrated using the same reference numbers as described relative to FIG. 4.

Referring to FIGS. 1 and 6, it can be seen that for fast motion recording, a user can set a fast motion speed at "n" and can select a source video segment by controlling an input to advanced feature buffer 136. Subsequently, CPU 122 will configure encoder 144 so that only every $n^{th}$ one of pictures P1 through P9 to be used to generate one MPEG picture during the period of "$t_0$" and "$t_0+t$". After the encoder 144 completes an MPEG picture 402, it will preferably drop the next picture P2 and P3 a total of n−1 times and instead use the $n^{th}$ next picture (in this case P4) to generate the following MPEG picture 404. Since the total length of "t/n" of the DVD video bit stream will be recorded on recordable media in "t" second, it can be seen that the fast motion picture can be recorded in real time. In FIG. 6, n is equal to three (3).

Figure 7:
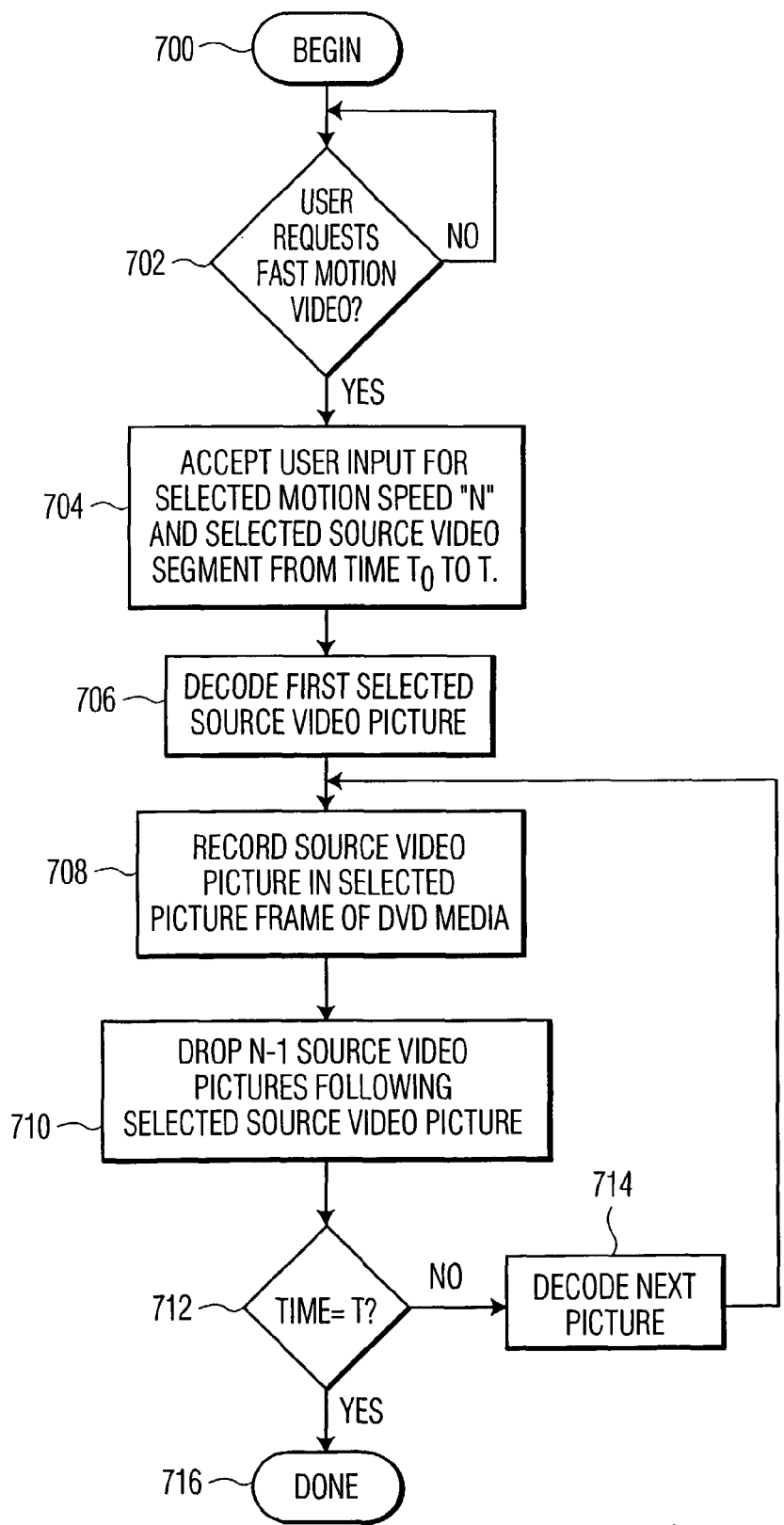
FIG. 7 is a flow chart which is useful for illustrating the process for fast motion recording.

FIG. 7 is a flow chart which is useful for illustrating the process for fast motion recording. The process begins in step 700. In step 702 the CPU determines whether it has received a user request for fast motion video recording. If so, the system can proceed to step 704 where it accepts user inputs for selected motion speed "n" and identification of a selected video segment which can be defined by a duration "t" at a normal or standard recording speed. In step 706, the packet video encoder 144 processes a first selected video source picture. In step 708 the selected video source picture is encoded by encoder 144 and subsequently recorded in a selected frame of the DVD media as illustrated in FIG. 6. In step 710, the encoder 144 subsequently drops n−1 source video pictures (P2 and P3 in FIG. 6) following the selected source video picture. These pictures are not encoded and are not stored on the DVD media. In step 712, the system control CPU 122 determines whether the time for fast motion recording has elapsed by comparing the elapsed record time to the user selected value t. If time=t, then the process terminates in step 716. If the time t for the recording session has not elapsed, then the system proceeds to step 714 where the next source picture (P4 in FIG. 6) is decoded. The system then proceeds to step 708 where the process continues until the user selected time has finally elapsed.

According to a preferred embodiment, the source video as used herein for creating slow motion or fast motion recording is played at a normal playback speed for the duration of the recording process. However, those skilled in the art will recognize that the invention is not limited in this regard, and other source video playback recording speeds can also be acceptable, provided that the video data is subsequently recorded as otherwise herein described.

The invention claimed is:

1. A method for editing source video in a DVD media for special effect comprising the steps of
receiving a source video signal comprised of a plurality of source pictures;
receiving a user request for fast motion video recording onto the DVD media and user input for a selected motion speed, n:
selecting only one out of every n of said source video pictures as a selected source video picture; and,
recording each said selected source video picture in a selected picture frame on said DVD media, wherein t seconds of said source video is recorded in response to a user selected recording time of t,
wherein n in as integer value greater than one determined by a user selected motion speed.

2. The method according to claim 1, wherein said user selected motion speed is n times faster relative to a normal motion speed.

3. The method according to claim 2, further comprising the step of recording said source video at said n motion speed from a start time t0 to an end time of t0+t.

4. The method according to claim 1, further comprising the step of dropping said source video pictures that are not selected source video pictures.

5. A recordable DVD device for editing source video in a DVD media for a special effect comprising:
decoder means for receiving a source video signal comprised of a plurality of source pictures;
control means for receiving a user request for fast motion video recording onto the DVD media and user input for a selected motion speed, n;
video processing means for selecting only one out of every n of said source video pictures as a selected source video picture;
means for recording each said selected source video picture in a selected picture frame on said DVD media; and,
timing means for recording t seconds of said source video in response to a user selected recording time of t,
wherein n is an integer value greater than one determined by a user selected motion speed.

6. The recordable DVD device according to claim 5, wherein said user selected motion speed is n times faster relative to a normal motion speed.

7. The recordable DVD device according to claim 6 wherein said means for recording is responsive to said timer means for recording said source video at said motion speed from a start time t0 to an end time of t0+t.

8. The recordable DVD device according to claim 5, wherein said video processing means drops said source video pictures that are not selected source video pictures.

* * * * *